United States Patent [19]

Wilhelm et al.

[11] 4,110,295

[45] Aug. 29, 1978

[54] STORAGE-STABLE, MOISTURE CURABLE MIXTURES CONTAINING MERCAPTO-TERMINATED LIQUID, OLIGOMER, LIQUID POLYMER OR LIQUID MONOMER, LIQUID OLIGOMER AND LIQUID POLYMER WITH SODIUM CHROMATE

[75] Inventors: Gerhard Wilhelm, Viernheim; Lothar Hockenberger, Ludwigshafen; Manfred Soyka, Duisburg; Peter Endruscheit, Lampertheim, all of Fed. Rep. of Germany

[73] Assignee: Rütgerskwerke Aktiengesellschaft, Frankfurt am Main, Fed. Rep. of Germany

[21] Appl. No.: 683,137

[22] Filed: May 4, 1976

[51] Int. Cl.² .......................... C08K 5/15; C08K 5/20; C08K 5/05

[52] U.S. Cl. .................. 260/30.4 R; 260/30.8 DS; 260/31.8 Z; 260/32.6 A; 260/32.6 R; 260/33.4 R; 528/374

[58] Field of Search ............ 260/79.1, 30.4 R, 31.8 Z, 260/30.8 DS, 32.6 A, 32.6 R, 33.4 R

[56] References Cited

U.S. PATENT DOCUMENTS

| | | | |
|---|---|---|---|
| 2,466,963 | 4/1949 | Patrick et al. | 260/79.1 |
| 3,402,155 | 9/1968 | Kutch | 260/79 |

*Primary Examiner*—Stanford M. Levin
*Attorney, Agent, or Firm*—Beveridge, DeGrandi, Kline & Lunsford

[57] ABSTRACT

A process for preparing a mixture capable of hardening when exposed to atmospheric moisture, but stable when stored in the absence of moisture, comprises mixing a liquid monomer, oligomer and polymer, liquid oligomer or liquid polymer having at least one terminal mercapto group with a latent hardener comprised of a paste containing anhydrous $Na_2CrO_4$ and a water-soluble solvent, such as dimethyl formamide, dimethyl sulfoxide, methanol, ethanol, glycol, glycerine or dioxane. The resulting mixture is useful as a caulking compound.

26 Claims, No Drawings

STORAGE-STABLE, MOISTURE CURABLE MIXTURES CONTAINING MERCAPTO-TERMINATED LIQUID, OLIGOMER, LIQUID POLYMER OR LIQUID MONOMER, LIQUID OLIGOMER AND LIQUID POLYMER WITH SODIUM CHROMATE

This invention relates to a process for preparing storage-stable, moisture-curable mixtures of liquid monomers, oligomers or polymers having at least one terminal mercapto group. More particularly, this invention relates to a process for preparing mixtures containing these monomers, oligomers or polymers and anhydrous sodium chromate as a curing agent.

Oligomers and polymers having terminal mercapto groups can be oxidized with oxidation agents to form disulfide bonds. The resulting products are rubber-like, elastic materials, which find a wide area of application, for instance, as packing materials, sealing materials, and as moldable masses. They exhibit very good resistance to weather and solvents.

These materials are frequently packaged as two-component systems, one component comprised of the compound having the terminal mercapto groups and the other component comprised of the oxidation agent. These two-component systems are disadvantageous in many cases, and there is often a desire to use a one-component system. This requires a storage-stable mixture comprised of the polymer and the oxidation agent, whereby the mixture is capable of polymerizing upon contact with atmospheric moisture at ambient temperature.

Heretofore, two types of technically exploitable one-component systems for mercapto terminated polymers were known. The first involves curing the mercapto-terminated compound with calcium peroxide. The other involves the use of zinc oxide or zinc peroxide for cross-linking the mercapto terminated compounds. The first system, which is described in U.S. Pat. No. 3,349,047, discloses a dry mercapto-terminated polymer mixed with calcium peroxide. The mixture is stable so long as it remains dry. Upon contact with atmospheric moisture, a skin quickly forms. The complete hardening, however, takes place only very slowly, so that such mixtures do not find application as gaskets or seals where the gasket or seal must be capable of withstanding stress or load shortly after application to the desired substrate.

U.S. Pat. No. 3,275,579 discloses a one-component system based on zinc oxide, which reacts in the alkaline but not in the neutral state with mercapto-terminated polymers. The alkaline medium is obtained by the action of atmospheric moisture on an amine-loaded molecular sieve. The process disclosed in U.S. Pat. No. 3,402,155 is the same in principle, but zinc peroxide is employed as an oxidation agent.

The same is true for U.S. Pat. No. 3,499,864, which achieves an improvement in storage stability merely by the addition of a small amount of sulfur to mixtures of the type disclosed in U.S. Pat. No. 3,402,155.

These three processes, which produce a basic milieu in the pertinent mixture from mercapto-terminated polymer and zinc oxide or zinc peroxide, through the fact that water molecules infiltrate an amine-loaded molecular sieve and liberate said amine, are disadvantageous because of the many water molecules that are needed in order to displace an amine molecule. These mixtures containing amine-loaded molecular sieves are necessarily dependent upon a large supply of moisture from the outside; i.e., while they quickly form a skin, they thoroughly harden only very slowly.

The disadvantage can be eliminated by the processes disclosed in DOS 1 800 982 and DOS 2 062 259. According to these processes, mercapto groups are oxidized in an acid medium with zinc peroxide. A one-component system is obtained when another substance is admixed with the mercapto-terminated polymer and zinc peroxide. This other substance is one that is capable of hydrolyzing upon contact with moisture in the air, while forming a low carboxylic acid. The acid (acetic acid) which is liberated, activates the zinc oxide and initiates the hardening of the polymer. This acid catalyzed hardening is disadvantageous in case of many polymers. Thus, in the case of polysulfide polymers, the danger exists that the polymer will be decomposed because the acid splits off ether and formal groups during the curing and heating operations. Moreover, the inexpensive chalks, which are important as fillers, cannot be used since there is the danger of formation of $CO_2$.

DOS 2 107 971 discloses a one-component system based on mercapto-terminated polymers and zinc peroxide, whereby ketimino magnesium compounds are added to the system. The ketimino magnesium compounds react upon contact with moisture in the atmosphere, thereby forming ketimines. These nitrogen bases catalyze the hardening operation and cause a relatively quick, thorough tempering of the mixture. The process is disadvantageous, however, because the resulting masses remain tacky for a relatively long time and do not exhibit satisfactory creep resistance.

It is the object of this invention to produce storage-stable, thixotropic mixtures containing the polymer and oxidation agent, which mixtures will quickly form a tack-free skin, and which will harden relatively quickly into rubber-like elastic masses.

In the present invention, the oxidation of the mercapto-terminated compounds takes place with anhydrous sodium chromate. Curing of mercapto-terminated polymers with chromate and bichromates is known in the art, and is described, for example, in U.S. Pat. No. 2,787,608 and U.S. Pat. No. 2,940,958. When the chromate employed is anhydrous, a storage-stable mixture capable of hardening upon the addition of water is formed. One can also mix the mercapto-terminated compound with a chromate containing water of crystallization, and the water which would cause hardening can be liberated by heating the mixture.

Surprisingly, it has now been found that storage-stable masses can be obtained when the mercapto-terminated compound is mixed with a latent hardener comprised of a paste containing anhydrous sodium chromate in a water-soluble organic solvent. These masses are even stable at elevated temperatures of about 120° to about 200° F. Upon contact with atmospheric moisture, the masses of the present invention form a tack-free skin within about 2 to about 4 hours, and thoroughly harden within a few days.

More particularly, this invention provides a process for preparing a mixture capable of hardening when exposed to atmospheric moisture, but stable when stored in the absence of moisture, wherein the process comprises mixing a liquid monomer, oligomer or polymer having at least one terminal mercapto group with a latent hardener comprised of a paste containing anhydrous sodium chromate and a water-soluble organic solvent.

This invention also provides a mixture capable of hardening when exposed to atmospheric moisture, but stable when stored in the absence of moisture, wherein the mixture comprises a liquid monomer, oligomer or polymer having at least one terminal mercapto group with a latent hardener comprised of a paste containing anhydrous sodium chromate and a water-soluble organic solvent.

This invention is applicable to all polymers or mixtures of monomer, oligomer and polymer compounds containing terminal mercapto groups. Typical of the materials that can be employed in this invention are polysulfide polymers and thioether polymers. The polymers employed in practicing this invention are liquid at room temperature. Typical compounds are commercially available under the tradename Thiokol Liquid Polymers from the Thiokol Corporation of Trenton, New Jersey.

2-mercapto ethanol can be mentioned as an example of a monomer compound having only one SH-group. In order to achieve greater flexibility of the hardened product, 2-mercapto ethanol is frequently added as a so-called chain-terminating agent to the polymers containing terminal mercapto groups.

An anhydrous sodium chromate free of water of crystallization must be employed. The quantity of sodium chromate is dependent upon the SH equivalent of the oxidizable polymer. The sodium chromate is employed in an amount sufficient to oxidize substantially all of the thiol groups in the polymer. Generally speaking, the sodium chromate is employed in an amount of about 3 to about 12 weight percent sodium chromate, related to the liquid mercapto-terminated polymer. Such amounts are generally sufficient for complete hardening.

The sodium chromate is finely pulverized and made into a paste with the organic solvent. While the sodium chromate and organic solvent can be employed in equal parts by weight, it is preferred that the weight ratio of sodium chromate to solvent be about 1:1 to about 1:2. Where it is desired to adjust the viscosity of the paste to that of the liquid polymer, it is advantageous to add a small quantity of filler to the paste. The type of solvent affects the rate of hardening of the mixture containing the sodium chromate, solvent and mercapto-terminated compound. The organic solvent must not be a solvent for the mercapto-terminated compound. Furthermore, it is not a solvent for the sodium chromate. The solvent, however, must be able to pick up water, to transport water and to enable the chromate to form ions in the water. The preferred solvents are dimethyl formamide, dimethyl sulfoxide, methanol, ethanol, glycol, glycerine and dioxane. The mixture of this invention is stable upon storage in a container protected against penetration by moisture, and this stability is obtained even at elevated temperatures, such as about 120° F. to about 200° F.

Plasticizers such as phthalates or chlorinated hydrocarbons, as well as pigments, fillers, thixotropic agents and drying agents, such as calcium carbonate, clay, soot, calcium oxide, molecular sieve, etc., can be added to the mixture of this invention.

This invention will be explained in more detail by the following examples in which all parts, proportions, ratios and percentages are by weight, unless otherwise indicated.

The polymer employed in Examples 1 and 2 is a polysulfide of the average structure

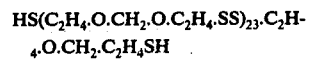

with approximately 0.5% cross-linkage. It has a mean molecular weight of 4000 and a viscosity at 27° C. of 350–450 poises. This polymer is commercially available from Thiokol Corporation.

EXAMPLE 1

(a) A basic mixture consisting of

|  | parts by weight |
|---|---|
| polysulfide-polymer | 1000 |
| chalk | 350 |
| clay | 150 |
| titanium dioxide | 300 |
| plasticizer (benzylbutyl phthalate) | 450 |
| sulfur | 2 |
| thixotroping agent (Aerosil: a finely divided SiO$_2$) | 40 |
| was mixed with a paste consisting of | |
| sodium chromate, anhydrous | 40 |
| dimethyl formamide | 60 |
| chalk | 70. |

The mixture was divided into three parts. One part was stored open at standard climate (23° C. and R.H. 50%), the second part at 40° C. and R.H. 70%, the third part was stored in a tube closed at 50° C. The mixture stored open at standard climate had a thin skin after about 3 hours and had thoroughly hardened to 9 mm after 10 days. The mixture stored open at 40° C. and R.H. 70% had a thin skin after 1 hour and had thoroughly hardened to 9 mm after 3 days. The mixture which was stored closed at 50° C. was still liquid after 10 days.

Sample articles were produced with the mixture by inserting the mixture in 15 × 15 × 50 mm grooves always between 2 concrete prisms (15 × 25 × 80 mm). The sample articles were stored for 14 days at standard climate (23° C. and R.H. 50%), and were subsequently tested:

| Modulus at 150% elongation | 1.7 kp/cm |
|---|---|
| Return after 60 minutes extension by 150% | 69%. |

(b) The basic mixture described in Example 1(a) was mixed with a paste consisting of:

|  | parts by weight |
|---|---|
| dimethyl formamide | 60 |
| chalk | 70. |

After an open storage of 7 days at 40° C. and R.H. 70%, the mixture was still liquid; i.e., without an oxidation agent no cross-linking of the polymmer occurs.

(c) The basic mixture described in Example 1(a) was mixed with 40 g of Na$_2$CrO$_4$ anhydrous and was stored open at 40° C. and R.H. 70%.

After 1 day, a thin skin had formed.

After 7 days, the skin was about 2 mm thick. From this it follows that the hardening will be considerably accelerated by the organic solvent (Example 1a).

(d) The basic mixture described in Example 1(a) was mixed with a paste consisting of:

| | parts by weight |
|---|---|
| $Na_2CrO_4 \cdot 4H_2O$ | 40 |
| dimethyl formamide | 60 |
| chalk | 70. |

Both in the case of open as well as in the case of closed storage at 23° C., the mass thoroughly hardened within 3 days. This shows that no storage-stable one-component mixture can be produced with sodium chromate containing water of crystallization.

(e) The basic mixture described in Example 1(a) was mixed with a paste consisting of:

| | parts by weight |
|---|---|
| sodium bichromate | 40 |
| dimethyl formamide | 60 |
| chalk | 70. |

Both in the case of open as well as in the case of closed storage at 23° C., the mass could not be processed any longer after 1 hour, and had hardened after 24 hours. This shows that in the case of conditions according to the present invention, a one-component system with only sodium bichromate is not possible.

EXAMPLE 2

The basic mixture described under Example 1(a) was mixed with a paste consisting of

| | parts by weight |
|---|---|
| sodium chromate, anhydrous | 40 |
| ethanol | 60 |
| chalk | 70. |

The mixture was divided. One part was stored open at 40° C. and R.H. 70%, the second part was stored in a tube closed at 50° C. The mixture which had been stored open had a tack-free skin after 2 hours, and had thoroughly hardened to 9 mm after 4 days while the mixture which was stored closed at 50° C. was still liquid after 7 days.

EXAMPLE 3

The product used in this Example is an oligomer polysulfide of the average structure $HS(C_2H_4.O.CH_2.O.C_2H_4.SS)_8.C_2H_4.O.CH_2.O.C_2H_4SH$ with about 2% cross-linking. It had an average molecular weight of 1000 and a viscosity at 27° C. of 7–12 poises. It is commercially available from the Thiokol Corporation.

250 g of this oligomer was mixed with a paste composed of:

| | parts by weight |
|---|---|
| sodium chromate, anhydrous | 40 |
| dimethyl formamide | 60 |
| chalk | 70. |

The mixture was divided. One part was stored open at 40° C. and R.H. 70%, the second part was stored closed at 50° C. The mixture which was stored open formed a tack-free skin within 2 hours, and had thoroughly hardened to 9 mm after 4 days. The sample stored closed was still liquid after that time.

The oligomer employed in this Example had such a large number of mercapto groups that 16% by weight sodium chromate was needed for curing. In practice, one will generally blend such an oligomer with a mercapto-terminated compound having fewer mercapto groups in order to lower the mercapto content per unit of weight.

EXAMPLE 4

The polymer employed in this Example is a polymer-captan of the average structure

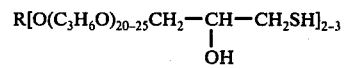

$$R[O(C_3H_6O)_{20-25}CH_2-\underset{\underset{OH}{|}}{CH}-CH_2SH]_{2-3}$$

whereby R signifies an aliphatic radical. The polymer has an average molecular weight of 6000 and a viscosity at 25° C of 60 poises. It is commercially available from Thiokol Corporation.

1000 g of this polymer were mixed with a paste consisting of:

| | parts by weight |
|---|---|
| sodium chromate, anhydrous | 40 |
| dimethyl formamide | 60 |
| chalk | 70. |

The mixture was divided. One part was stored open at 40° C and R. H. 70%, the second part was stored closed at 50° C.

A thin skin formed within 1 hour on the mixture stored open, and after 3 days the mass had hardened through at a depth of 9 mm. The sample stored closed, was still liquid after this time.

What is claimed is:

1. A process for preparing a mixture capable of hardening when exposed to atmospheric moisture, but stable when stored in the absence of moisture, said process comprising mixing a liquid polymer, a liquid oligomer or a mixture of liquid monomer, oligomer and polymer having at least one terminal mercapto group with a latent hardener comprised of a paste containing anhydrous sodium chromate and a water-soluble organic solvent.

2. Process according to claim 1 wherein said organic solvent is dimethyl formamide.

3. Process according to claim 1 wherein said organic solvent is methanol.

4. Process according to claim 1 wherein said polymer is a polysulfide polymer or a thioether polymer.

5. Process according to claim 1 wherein said mixture contains about 3 to about 12 weight percent $Na_2CrO_4$, related to weight of liquid mercapto-terminated polymer.

6. Process according to claim 1 wherein said latent hardener contains said $Na_2CrO_4$ and said solvent in a weight ratio of $Na_2CrO_4$:solvent of about 1:1 to about 1:2.

7. Process according to claim 1 wherein said solvent is selected from the group consisting of dimethyl formamide, dimethyl sulfoxide, methanol, ethanol, glycol, glycerin and dioxane.

8. A mixture capable of hardening when exposed to atmospheric moisture, but stable when stored in the absence of moisture, said mixture comprising a liquid polymer, a liquid oligomer or a mixture of a liquid monomer, oligomer and polymer having at least one terminal mercapto group and a latent hardener comprised of a paste containing anhydrous sodium chromate and a water-soluble organic solvent.

9. Mixture according to claim 8 wherein said organic solvent is dimethyl formamide.

10. Mixture according to claim 8 wherein said organic solvent is methanol.

11. Mixture according to claim 8 wherein said polymer is polysulfide polymer or a thioether polymer.

12. Mixture according to claim 8 wherein said mixture contains about 3 to about 12 weight percent of said sodium chromate, related to weight of liquid mercapto-terminated polymer.

13. Mixture according to claim 8 wherein said latent hardener contains said sodium chromate and said solvent in a weight ratio of sodium chromate:solvent of about 1:1 to about 1:2.

14. Mixture according to claim 8 wherein said solvent is selected from the group consisting of dimethyl formamide, dimethyl sulfoxide, methanol, ethanol, glycol, glycerin and dioxane.

15. Process according to claim 1 wherein said latent hardener is mixed with said mixture of monomer, oligomer and polymer having said at least one terminal mercapto group.

16. Process according to claim 1 wherein said latent hardener is mixed with said polymer having at least one terminal mercapto group.

17. Process according to claim 1 wherein said solvent is a non-solvent for said sodium chromate and said mercapto-terminated compound, but is capable of picking up water and transporting water to thereby enable chromate ions from said sodium chromate to form in said water.

18. Process according to claim 1 wherein said polymer is a polysulfide having the approximate formula:

$$HS(C_2H_4.O.CH_2.O.C_2H_4.SS)_{23}.C_2H_4.O.CH_2.O.C_2H_4SH,$$

said polymer having about 0.5% cross-linking, a mean molecular weight of about 4000 and a viscosity at 27° C. of 350 to 450 poises.

19. Process according to claim 1 wherein said oligomer is a polysulfide having the approximate formula:

$$HS(C_2H_4.O.CH_2.O.C_2H_4.SS)_8.C_2H_4.O.CH_2.O.C_2H_4SH,$$

said oligomer having about 2% cross-linking, a mean molecular weight of about 1000 and a viscosity at 27° C. of 7 to 12 poises.

20. Process according to claim 1 wherein said polymer is a polymercaptan having the approximate formula:

$$R[O(C_3H_6O)_{20-25}CH_2-\underset{OH}{CH}-CH_2SH]_{2-3},$$

wherein R is an aliphatic radical and said polymer has an average molecular weight of about 6000 and a viscosity at 25° C. of about 60 poises.

21. Mixture according to claim 8 wherein said latent hardener is mixed with said mixture of monomer, oligomer and polymer having said at least one terminal mercapto group.

22. Mixture according to claim 8 wherein said latent hardener is mixed with said polymer having at least one terminal mercapto group.

23. Mixture according to claim 8 wherein said solvent is a non-solvent for said sodium chromate and said mercapto-terminated compound, but is capable of picking up water and transporting water to thereby enable chromate ions from said sodium chromate to form in said water.

24. Mixture according to claim 8 wherein said polymer is a polysulfide having the approximate formula:

$$HS(C_2H_4.O.CH_2.O.C_2H_4.SS)_{23}.C_2H_4.O.CH_2.O.C_2H_4SH,$$

said polymer having about 0.5% cross-linking, a mean molecular weight of about 4000 and a viscosity at 27° C. of 350 to 450 poises.

25. Mixture according to claim 8 wherein said oligomer is a polysulfide having the approximate formula:

$$HS(C_2H_4.O.CH_2.O.C_2H_4.SS)_8.C_2H_4.O.CH_2.O.C_2H_4SH,$$

said oligomer having about 2% cross-linking, a mean molecular weight of about 1000 and a viscosity at 27° C. of 7 to 12 poises.

26. Mixture according to claim 1 wherein said polymer is a polymercaptan having the approximate formula:

$$R[O(C_3H_6O)_{20-25}CH_2-\underset{OH}{CH}-CH_2SH]_{2-3},$$

wherein R is an aliphatic radical and said polymer has an average molecular weight of about 6000 and a viscosity at 25° C. of about 60 poises.

* * * * *